(12) United States Patent
Kim et al.

(10) Patent No.: US 8,973,210 B2
(45) Date of Patent: Mar. 10, 2015

(54) ROBOT CLEANER

(75) Inventors: Sung-Guen Kim, Changwon (KR);
In-Bo Shim, Changwon (KR);
Byung-Doo Yim, Changwon (KR);
Ji-Hoon Sung, Changwon (KR);
Bong-Ju Kim, Changwon (KR)

(73) Assignee: LG Electronics Inc., Seoul (KR)

( * ) Notice: Subject to any disclaimer, the term of this patent is extended or adjusted under 35 U.S.C. 154(b) by 567 days.

(21) Appl. No.: 13/380,347

(22) PCT Filed: Jun. 30, 2009

(86) PCT No.: PCT/KR2009/003563
§ 371 (c)(1),
(2), (4) Date: Dec. 22, 2011

(87) PCT Pub. No.: WO2011/002114
PCT Pub. Date: Jan. 6, 2011

(65) Prior Publication Data
US 2012/0090126 A1    Apr. 19, 2012

(51) Int. Cl.
*A47L 9/28*    (2006.01)
*E01H 1/08*    (2006.01)
*A47L 9/00*    (2006.01)
*G05D 1/02*    (2006.01)

(52) U.S. Cl.
CPC .............. *A47L 9/009* (2013.01); *G05D 1/0238* (2013.01); *A47L 2201/04* (2013.01); *G05D 2201/0203* (2013.01); *G05D 2201/0215* (2013.01)

USPC ........................................... 15/339; 15/340.1

(58) Field of Classification Search
CPC .. A47L 9/2857; A47L 2201/14; E01H 1/0836
USPC ................................................. 15/339, 340.1
IPC ...................................... A47L 9/28; E01H 1/08
See application file for complete search history.

(56) References Cited

U.S. PATENT DOCUMENTS 8,739,355 B2 *    6/2014    Morse et al. .................... 15/319

FOREIGN PATENT DOCUMENTS

| JP | 05253122 A | 10/1993 |
| JP | 07079890 A | 3/1995 |
| JP | 2006155274 A | 6/2006 |
| KR | 1020060024202 A | 3/2006 |
| KR | 100815570 B1 | 3/2008 |

* cited by examiner

*Primary Examiner* — David Redding
(74) *Attorney, Agent, or Firm* — McKenna Long & Aldridge LLP

(57) ABSTRACT

Provided is a robot cleaner. In an embodiment, the robot cleaner for avoiding obstacles and sucking foreign materials using a plurality of sensors and a suction motor is characterized in that a drive suppression unit for detecting obstacles having a corresponding height is integrated with a base for forming a lower portion of a main body in order to not climb obstacles of a constant height during a driving period of the robot cleaner. The present disclosure according to the embodiment improves drive stability of the robot cleaner by sensing a threshold in erroneous state of the sensor for sensing the threshold.

9 Claims, 9 Drawing Sheets

(A)

(B)

(A)

(B)

ROBOT CLEANER

This application is a National Stage Entry of International Application No. PCT/KR2009/003563, filed Jun. 30, 2009 which is incorporated herein by reference for all purposes.

BACKGROUND

The present disclosure relates a robot cleaner.

In general, robot cleaners are cleaning apparatuses which absorb dusts and foreign substances existing on a bottom surface together with air to remove the dusts and foreign substances while driving an area to be cleaned by oneself without the need for continuous manipulation.

For this, such a robot cleaner includes a plurality of sensors such as a sensor for detecting obstacles and a sensor for detecting a bottom surface, a threshold, a cliff, etc.

Among this, the sensor for detecting the bottom surface, threshold, and cliff may be disposed on a base constituting a lower portion of the robot cleaner to transmit light or infrared light toward a lower side. Then, the sensor may classify the bottom, threshold, and cliff according to a received value using received information to perform avoidance driving depending on the classified results.

However, in the robot cleaner according to the related art, when the sensors for detecting the bottom, the threshold, or the cliff are malfunctioned, the robot cleaner may be damaged.

That is, when the threshold is not detected due to the malfunction of the sensors, the robot cleaner may get out of a required cleaning area. Also, when the cliff is not detected, the robot cleaner may fall down and thus be damaged.

SUMMARY

Embodiments provide a robot cleaner which detects a threshold or obstacle having a drive suppression height due to a lower configuration of a base.

Embodiments also provide a robot cleaner including a caster for reducing an impact occurring when the robot cleaner passes through a threshold or obstacle having a drive allowance height.

In one embodiment, a robot cleaner which sucks foreign substances on an area to be cleaned while avoiding an obstacle using a plurality of sensors and a suction motor includes: a base defining a lower portion of a main body; and a drive suppression unit integrated with the base, the drive suppression unit interfering with an obstacle having a predetermined height to prevent the robot cleaner from passing over the obstacle having the predetermined height.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

Figure 1:
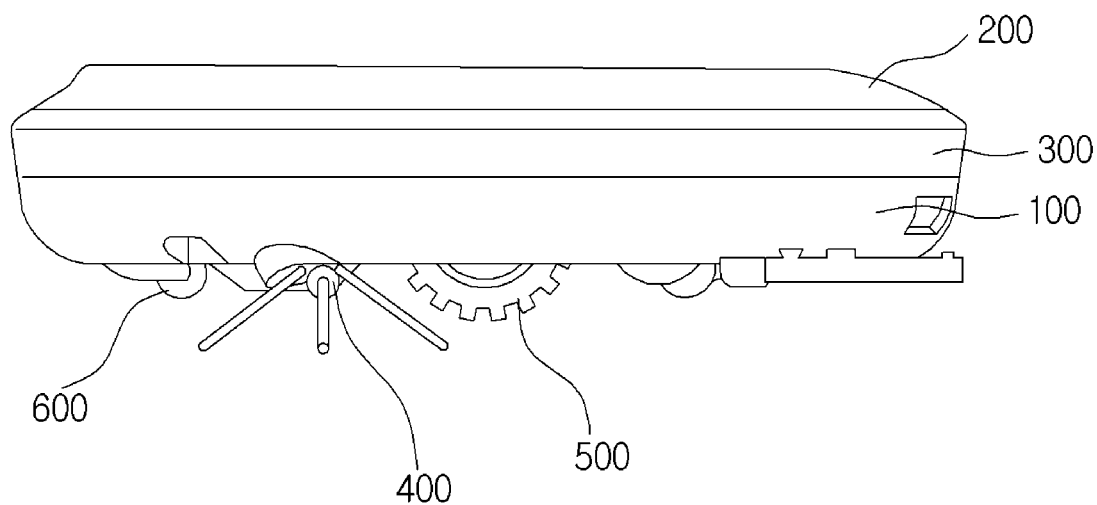
FIG. 1 is a side view of a robot cleaner according to an embodiment.

FIG. 1 is a side view of a robot cleaner according to an embodiment.

Referring to FIG. 1, a robot cleaner 1 according to the current embodiment includes a base 100 defining a lower portion of a main body and a cover 200 covering an upper side of the base 100 to define an upper portion of the main body. Here, an outer appearance of the robot cleaner 1 may be defined by the base 100 and the cover 200. A suction motor for sucking dusts and a plurality of electric components may be disposed within an inner space defined by coupling the base 100 to the cover 200.

A sensor mounting unit 300 is disposed on the base 200. Here, a plurality of sensors arranged along an edge of the base 200 with a predetermined distance to detect and avoid obstacles and walls so that the robot cleaner 1 drives an area to be cleaned are disposed on the sensor mounting unit 300.

Also, the base 100 includes a drive wheel 500 and caster 600 for moving the robot cleaner 1 and an agitator (see reference numeral 160 of FIG. 2) and side brush 400 for scattering foreign substances on the area to be cleaned.

Figure 2:
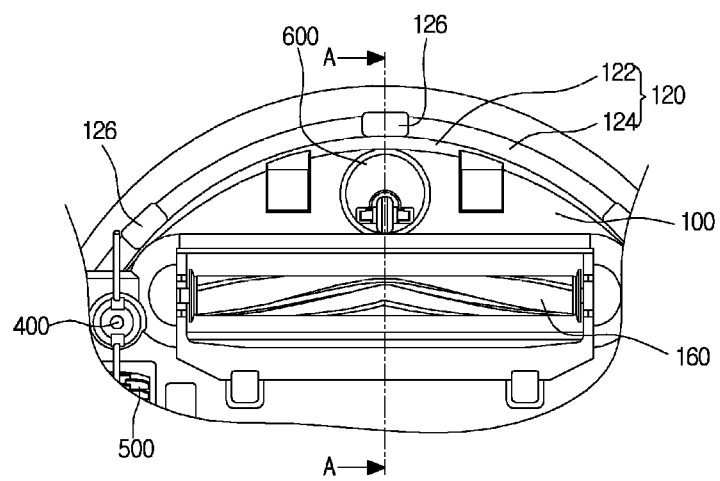
FIG. 2 is a partial bottom view of a robot cleaner according to an embodiment.

For detailed description, FIG. 2 illustrates a partial bottom view of the robot cleaner according to an embodiment.

Referring to FIG. 2, the agitator 160 is rotatably disposed on a dust suction unit (not shown) disposed on a bottom surface of the base 100. The side brush 400 may be disposed at a side of the agitator 160.

The drive wheel 500 for moving the robot cleaner 1 is disposed at a rear side of the side brush 400. The caster 600 for assisting the movement of the robot cleaner 1 is disposed at a front side of the agitator 160.

A drive suppression unit 120 for suppressing the driving of the robot cleaner 1 is disposed on the base 100. The drive suppression unit 120 may structurally classify the obstacles into climbable obstacles and unclimbable obstacles according to heights of the obstacles.

For this, the drive suppression unit 120 includes a sensor receiving groove 124 in which a portion of the base 100 is recessed and a hook 122 relatively protruding with respect to the recessed sensor receiving groove 124 to interfere with a portion of the obstacles during the driving.

Figure 3:
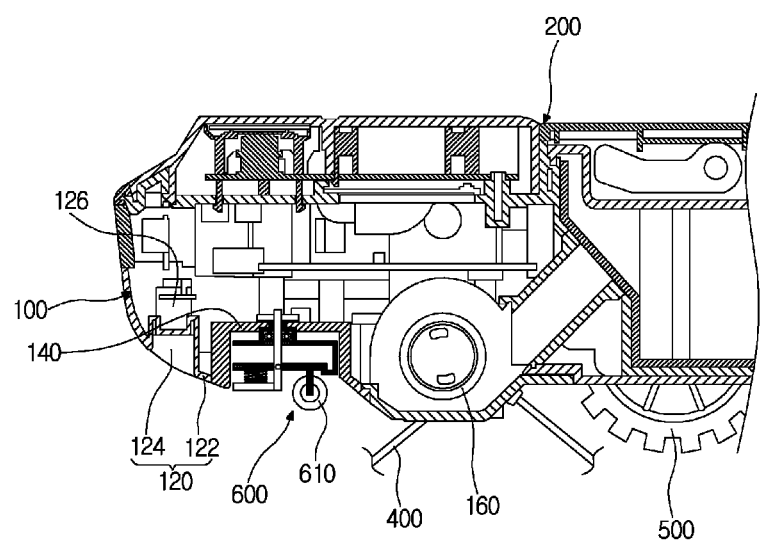
FIG. 3 is a sectional view taken along line A-A of FIG. 2.

FIG. 3 is a sectional view taken along line A-A of FIG. 2.

Referring to FIG. 3, a front portion of the base 100 may have a thickness gradually increasing from a front side to a rear side.

The sensor receiving groove 124 may provide a space for mounting a detection sensor that is recessed in an arc shape at a front side of the drive wheel 500 along an edge of the base 100 to detect a threshold or cliff.

Thus, the sensor receiving groove 124 may have a deep depth at a rear side when compared to a front side with respect to the bottom surface of the base 100. Also, the sensor receiving groove 124 may have a width corresponding to a size of the detection sensor 126.

Also, a plurality of sensor mounting holes (not shown) may be disposed spaced a predetermined distance from each other on a bottom surface of the sensor receiving groove 124. The detection sensor 126 may be fitted into the sensor mounting holes.

A semiconductor photo sensor for detecting the cliff and threshold through a resistance variable according to the amount of light may be used as the detection sensor 126. In the current embodiment, a CdS sensor is used as the detection sensor 126.

The sensor receiving groove 124 may be recessed, and also the rear side of the base 100 may further protrude than the front side of the base 100 due to the configuration of the base 100 to form the hook 122. Like the sensor receiving groove 124, the hook 122 may be disposed on an edge of a front side of the base 100.

Thus, the protruding height of the hook 122 may be determined when the base 100 is formed. Also, the protruding range of the hook 122 may be determined in consideration of a range in which the caster 600 can pass over the obstacles.

That is, the hook 122 may prevent the robot cleaner 1 from passing obstacles, over which should not pass, such as a threshold toward a front door or a bathroom threshold in the obstacles over through the robot cleaner 1 can pass. The hook 122 may protrude so that an end of the hook 122 is disposed at a position higher than that of an upper end of a wheel 610 of the caster 600 and lower than that of a center of the wheel 610.

Also, the hook 122 may be disposed in a direction perpendicular to the mounting position of the detection sensor 126 to define an inflow path of light detected by the detection sensor 126.

Thus, when the hook 122 contacts the obstacle, since light incident from a rear side of the hook 122 is blocked, the amount of light incident into the detection sensor may be significantly reduced to more improve the obstacle detection performance of the detection sensor 126.

When the robot cleaner 1 reaches the cliff, light may be blocked by the hook 122 due to a small light incident angle. Thus, light incident into a rear side of the hook 122, which is not incident into the detection sensor 126, may be incident into the detection sensor 126 because a gap between the bottom surface and the hook 122 becomes large.

That is, when the gap between the hook 122 and the bottom surface is large, the large amount of light having a relatively large light incident angle may be incident into the detection sensor 126. Thus, a variation of the amount of light may be increased to improve the cliff detection performance of the detection sensor 126.

A caster mounting unit 140 recessed inward may be disposed on the base 100 to mount the caster 600 for assisting the driving of the robot cleaner 1.

Hereinafter, a structure and an operation of the door basket 600 will be described in detail with reference to the accompanying drawings.

Figure 4:
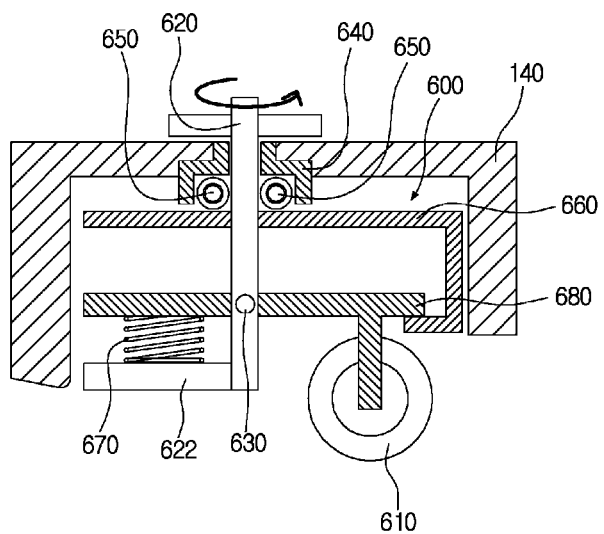
FIGS. 4 and 5 are schematic views illustrating a caster of a robot cleaner according to an embodiment.
Figure 5:
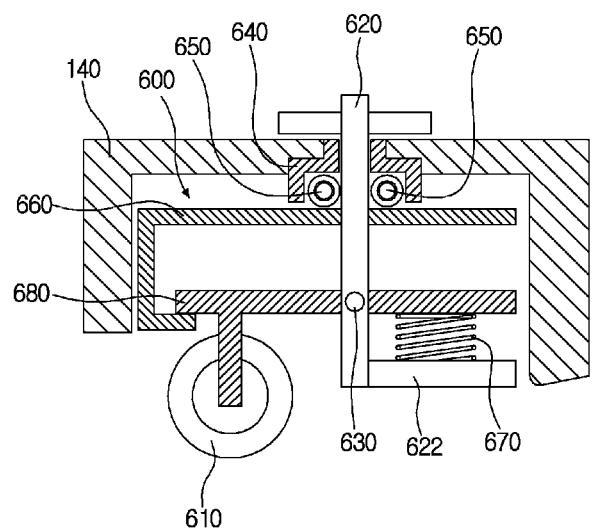

FIGS. 4 and 5 are schematic views illustrating the caster of the robot cleaner according to an embodiment.

As shown in FIGS. 4 and 5, the caster 600 of the robot cleaner 1 according to an embodiment includes a main shaft 620 for rotating the wheel 610 at an angle of about 360°, a variable frame 680 rotatably connected to the main frame 620, and an elastic member 670 for elastically supporting the variable frame 680.

In detail, the main shaft 620 is rotatably fixed to the caster mounting unit 140 disposed on the base 100.

The main shaft 620 may be disposed on a central portion of the caster mounting unit 140 so that an upper end thereof passes through the central portion of the caster mounting unit 140. An end of the main shaft 620 exposed to the outside of the caster mounting unit 140 may be fixed using a separate fixing pin to allow the main shaft 620 to be rotated separately with respect to the caster mounting unit 140.

To smoothly rotate the main shaft 620, a bush 640 for receiving the main shaft 620 and a bearing 650 disposed within the bush 640 may be further disposed inside the caster mounting unit 140. Accordingly, the caster 600 may be smoothly rotated at an angle of about 360°.

Also, the variable frame 680 may be fixed to the main shaft 620 through a shaft fixing pin 630 so that the wheel 610 having a side for performing a rolling motion while contacting the bottom or obstacles and rotatably fixed to the main shaft 620 is connected to the main shaft 620.

The shaft fixing pin 630 may pass through a center of the variable frame 680 and the main shaft 620 and be fixed to the main shaft 620 to define a rotation center of the variable frame 680.

A member support unit 622 extending downward from the variable frame 680 may be disposed on an end of the main shaft 620.

The elastic member 670 for elastically supporting the variable frame 680 may be disposed between the other side of the variable frame 680 which is not connected to the wheel 610 and the member support unit 622 disposed under the variable frame 680 extending from the main shaft 620.

The elastic member 670 may have a size enough to contact the variable frame 680 and the member support unit 622. The elastic member 670 may be formed of an elasticible material. In the current embodiment, a coil spring may be used as the elastic member 670.

Also, the elastic member 670 may include a torsion spring. That is, the elastic member 670 may be connected to the shaft fixing pin 630 connecting the main shaft 620 to the variable frame 680 to perform the same function.

As described above, when the elastic member 670 is provided, a restoring force of the elastic member 670 may be applied to the variable frame 680 so that the variable frame 680 is inclined in one direction.

Thus, a support frame 660 for horizontally maintaining the variable frame 680 in a state the variable frame 680 does not contact the obstacles may be disposed on the main shaft 620.

The support frame 660 may be fixed to the main shaft 620 at a position spaced a predetermined height upward from the variable frame 680 so that the variable frame 680 secures a rotatable space thereof. Also, an end of the support frame 660 may be bent so that it is disposed under an end of the horizontally variable frame 680 in a direction opposite to that in which the restoring force of the elastic member 670 is applied.

Thus, even though the restoring force of the elastic member 670 is continuously applied to the variable frame 680, the movement of the variable frame 680 may be suppressed by the support frame 660 in the direction in which the restoring force is applied. Thus, the variable frame 680 may be maintained in the horizontal state.

Figure 6:
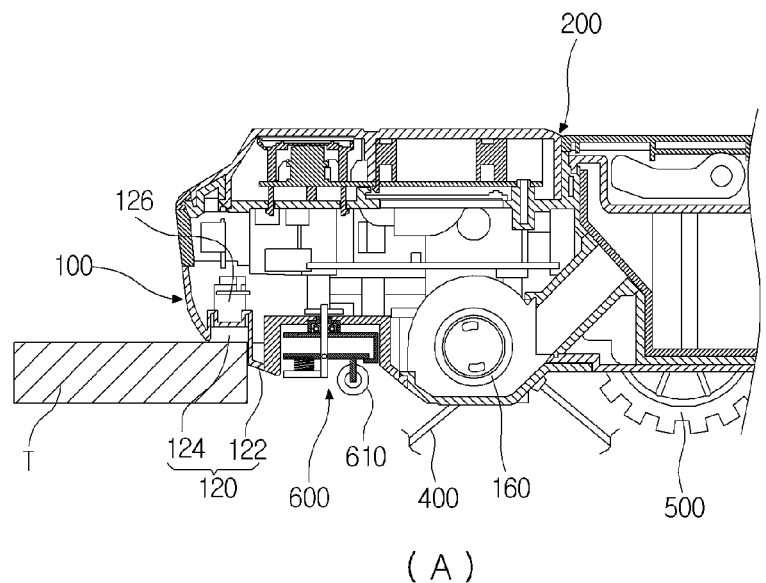
FIG. 6 is a view illustrating a threshold avoidance driving state of a robot cleaner according to an embodiment.
Figure 6:
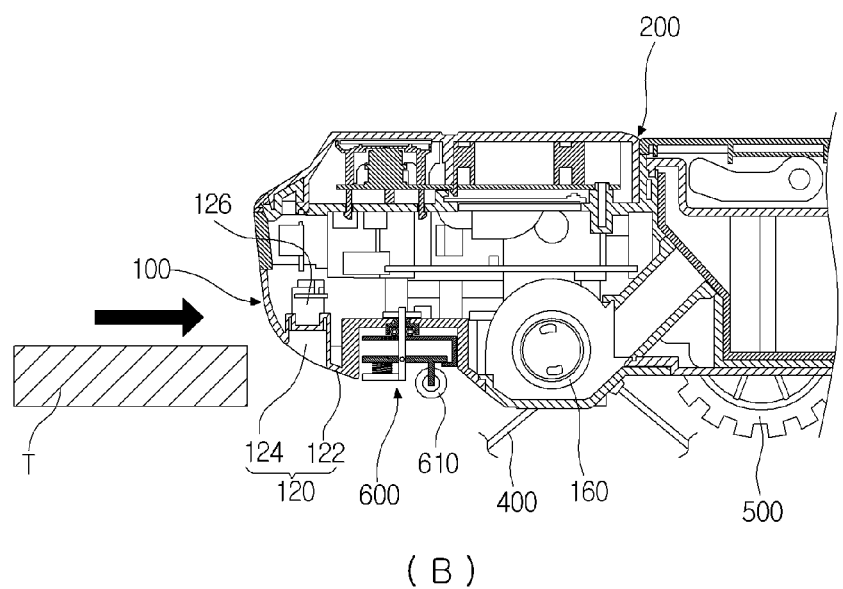

FIG. 6 is a view illustrating a threshold avoidance driving state of the robot cleaner according to an embodiment.

FIG. 6A illustrates a state in which the robot cleaner 1 reaches a threshold T and then is stopped during the cleaning. When the robot cleaner 1 driven toward the threshold T contacts the threshold T during the cleaning, the hook 122 may interfere with the threshold T to stop the movement of the robot cleaner 1.

In the above-described state, the amount of light incident into the detection sensor 126 may be reduced by the hook 122 and the threshold T. Thus, the robot cleaner 1 recognizes the threshold T as an obstacle that should not pass over.

As described above, the threshold T having the predetermined height may be disposed between the front door and a living room or the living room and the bathroom. A space over the threshold T may be excepted from the area to be cleaned using the robot cleaner 1.

Thus, as shown in FIG. 6B, the robot cleaner 1 may be moved in a direction away from the threshold T. When the robot cleaner 1 is spaced a predetermine distance from the threshold T, the robot cleaner 1 may be changed in a moving direction to avoid the threshold T, and then continuously drive the area to be cleaned.

Also, when the robot cleaner 1 approach the threshold T at a low speed, the robot cleaner 1 may detect first the threshold T through the amount of light incident into the detection sensor 126 before the hook 122 interferes with the threshold T. Thus, before the hook 122 collides with the threshold T, the robot cleaner 1 avoids the threshold T.

Figure 7:
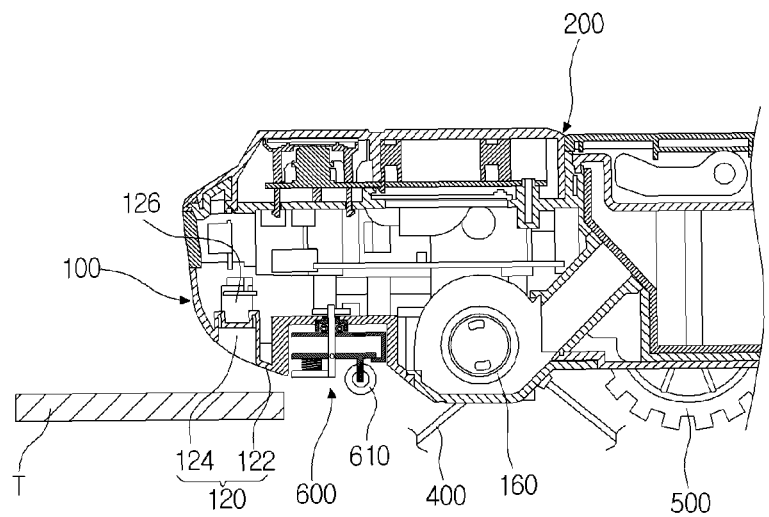
FIG. 7 is a view illustrating a driving state passing over a threshold in a robot cleaner according to an embodiment.
Figure 7:
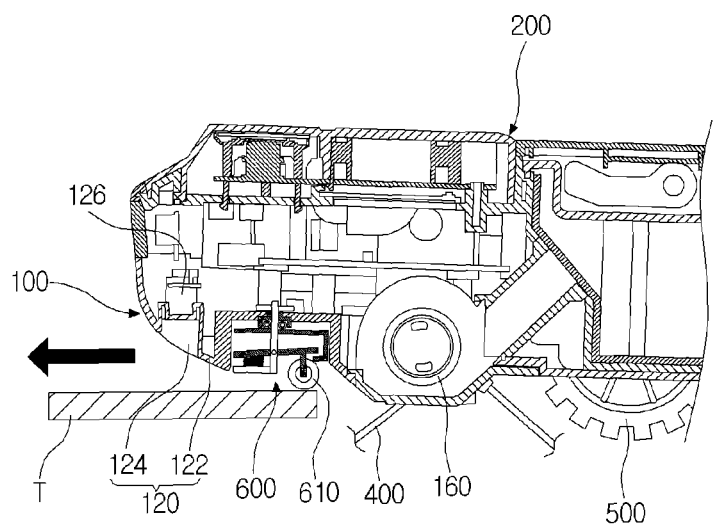

FIG. 7 is a view illustrating a threshold avoidance driving state of the robot cleaner according to an embodiment.

FIG. 7A illustrates a state in which the robot cleaner 1 is driven toward a threshold T or obstacle having a relatively low height during the cleaning. Here, since the threshold T has a height less than the protruding length of the hook 122, the robot cleaner 1 may pass over the threshold T.

The threshold T having the above-described height may be disposed between a room and a room or a riving room and a room. Thus, the threshold T may be included in the area to be cleaned.

Thus, as shown in FIG. 7B, the robot cleaner 1 may pass over the threshold T having the above-described height. Here, the caster 600 may be varied in height to reduce an impact applied to the robot cleaner 1.

Figure 8:
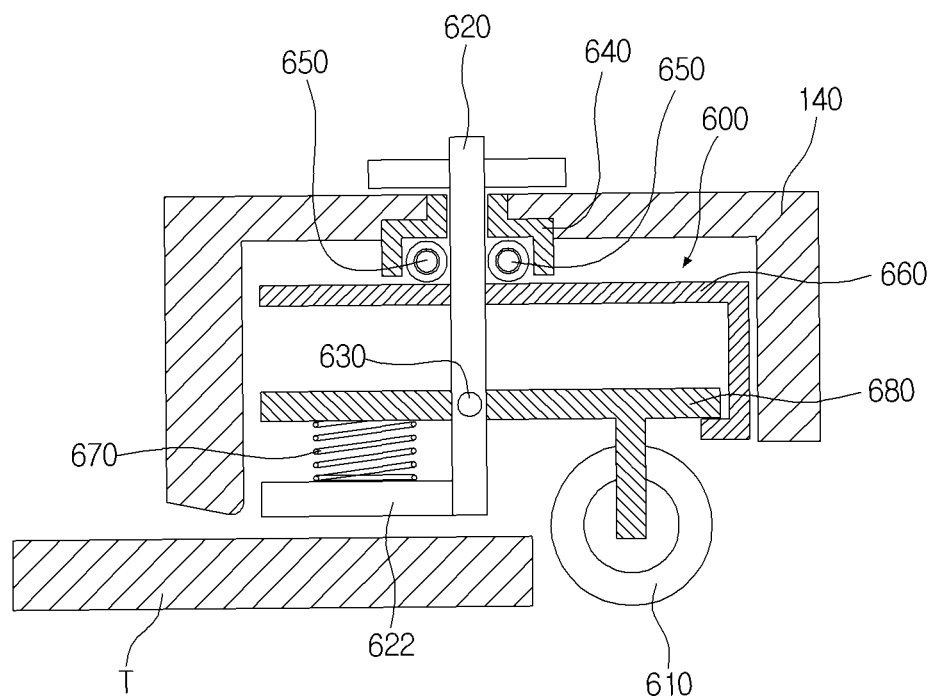
FIGS. 8 and 9 are schematic views illustrating an operation structure of the caster in the driving state of FIG. 7.
Figure 9:
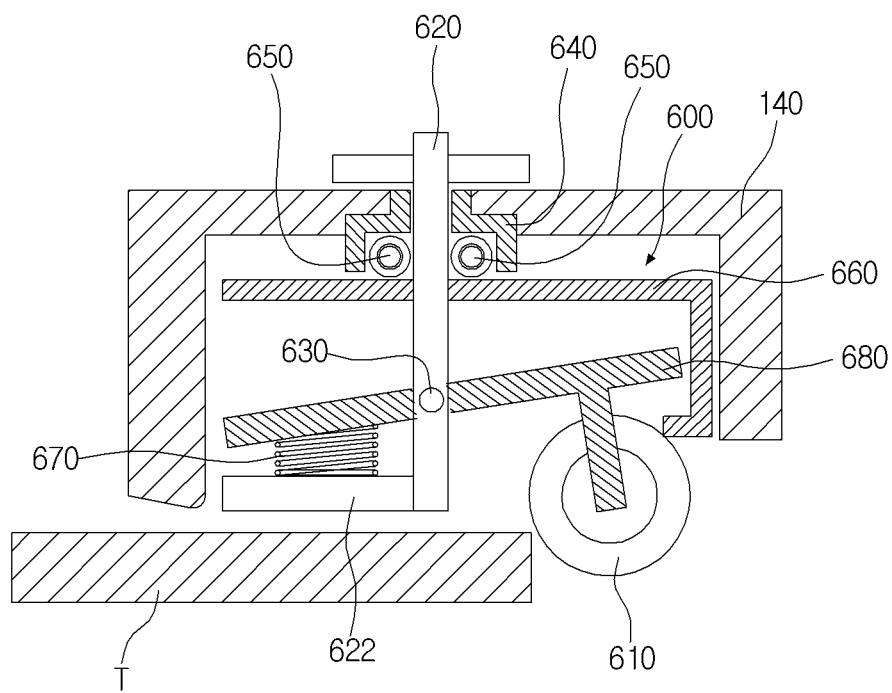

In detail, FIGS. 8 and 9 are schematic views illustrating an operation structure of the caster in the driving state of FIG. 7.

As described above, in the robot cleaner 1 driven toward the threshold T having a relatively low height, the hook 122 does not interfere with the threshold T.

Thus, after the wheel 610 contacts the threshold T, the robot cleaner 1 may be continuously driven to pass over the threshold T.

Here, the wheel 610 may be lifted upward, and thus a side of the variable frame 680 connected to the wheel 610 may be rotated upward and the other side may be rotated downward to compress the elastic member 670, thereby realizing the state as shown in FIG. 9.

When the robot cleaner 1 is continuously driven after the above-described state, the caster 600 and the drive wheel 500 may pass over the threshold T to contact the bottom surface.

Here, the caster 600 compressed by the elastic member 670 may be released by the movement of the wheel 610. Thus, as shown in FIG. 8, the variable frame 680 may be returned to its initial position by the restoring force.

In the restoring process, the elastic member 670 may be vibrated several times until the variable frame 680 is returned to the initial position thereof to stabilize the position of the variable frame 680. Then, the stabilized variable frame 680 may be stopped by the support frame 660 at the initial position.

Therefore, since the impact applied to the robot cleaner 1 when the robot cleaner 1 pass over the obstacles is reduced, the drive stability of the robot cleaner 1 may be improved.

In the robot cleaner according to the embodiments, the driving operation of the robot cleaner may be suppressed by the drive suppression unit including the sensor receiving groove recessed in the base and the hook protruding from the base.

That is, due to the concern of damage of the robot cleaner, the drive suppression unit may classify the obstacles into the climbable obstacles and the unclimbable obstacles. Thus, even though the detection function of the detection sensor is failed or the detection sensor is malfunctioned, the robot cleaner may be stably driven.

Also, in the current embodiments, the caster for assisting the driving of the robot cleaner may be adjusted in height by the elasticity. Thus, when the robot cleaner passes over the obstacles, the impact applied to the robot cleaner may be reduced.

In addition, the detection sensor for detecting the obstacles such as the cliff or threshold may be provided as the semi-conductor photo sensor. Also, the detection sensor may be disposed inside the sensor receiving groove which is recessed inward from the base. Thus, the amount of light incident into the detection sensor may be significantly changed according to whether the obstacles exist. Therefore, the performance of the detection sensor may be improved.

Thus, in the robot cleaner according to the embodiments, the structural drive suppression structure for improving the detection performance of the sensor and supplementing the malfunction of the sensor may be provided, and also, the impact applied to the robot cleaner when the robot cleaner passes over the obstacles may be significantly reduced. There, the drive stability of the robot cleaner may be improved.

What is claimed is:

1. A robot cleaner which sucks foreign substances on an area to be cleaned while avoiding an obstacle using a plurality of sensors and a suction motor, the robot cleaner comprising:
   a base defining a lower portion of a main body; and
   a drive suppression unit integrated with the base, the drive suppression unit interfering with an obstacle having a predetermined height to prevent the robot cleaner from passing over the obstacle having the predetermined height,
   wherein the drive suppression unit comprises:
      a sensor receiving groove in which a portion of the base is recessed to provide a mounting space of a detection sensor for detecting a threshold or cliff; and
      a hook in which a portion of the base relatively protrudes due to the recession of the sensor receiving groove to interfere with the obstacle.

2. The robot cleaner according to claim 1, wherein a sensor mounting hole for mounting the detection sensor is defined in the sensor receiving groove.

3. The robot cleaner according to claim 1, wherein the drive suppression unit is disposed at a front side of a drive wheel for driving and is disposed along an edge of the base.

4. The robot cleaner according to claim 1, wherein the base comprises a caster which is varied in position to reduce an impact applied to the robot cleaner when the robot cleaner passes over the obstacle that does not interfere by the drive suppression unit.

5. The robot cleaner according to claim 4, wherein the caster comprises:
   a main shaft rotatably fixed to the base;

a variable frame rotatably connected to the main shaft, the variable frame having one side connected to a wheel; and an elastic member disposed between the other side of the variable frame disconnected to the wheel and a member support unit extending from the main shaft and disposed under the variable frame to elastically support the variable frame.

6. The robot cleaner according to claim 5, wherein a support frame suppressing a portion of the variable frame connected to the wheel to maintain a horizontal state of the variable frame is disposed on the main shaft.

7. The robot cleaner according to claim 5, wherein a shaft fixing pin connecting the main shaft to the variable frame to define a rotation center is fitted into a central portion of the variable frame.

8. A robot cleaner, comprising:
a base defining a lower portion of a main body;
a detection sensor to detect an obstacle or cliff; and
a caster disposed on the base,
wherein the caster comprises:
  a main shaft rotatably connected to the base;
  a variable frame rotatably connected to the main shaft, the variable frame having one side connected to a wheel; and
  an elastic member connected to the variable frame to provide elastic force to the variable frame.

9. The robot cleaner according to claim 8, further comprising a support frame to maintain a horizontal state of the variable frame.

* * * * *